United States Patent
Anderson et al.

(10) Patent No.: US 9,998,205 B2
(45) Date of Patent: Jun. 12, 2018

(54) TRANSPARENT SATELLITE COMMUNICATIONS IN A CELLULAR CENTRIC M2M NETWORK

(71) Applicant: Skywave Mobile Communications Inc., Ottawa (CA)

(72) Inventors: Stephen James Anderson, Stittsville (CA); Jeff Joslin, Ottawa (CA)

(73) Assignee: SKYWAVE MOBILE COMMUNICATIONS INC., Ottawa (CA)

( * ) Notice: Subject to any disclaimer, the term of this patent is extended or adjusted under 35 U.S.C. 154(b) by 0 days. days.

(21) Appl. No.: 14/283,544

(22) Filed: May 21, 2014

(65) Prior Publication Data

US 2015/0341108 A1    Nov. 26, 2015

(51) Int. Cl.
*H04B 7/185* (2006.01)
*H04L 29/06* (2006.01)
*H04W 84/06* (2009.01)

(52) U.S. Cl.
CPC ....... *H04B 7/1851* (2013.01); *H04B 7/18563* (2013.01); *H04L 69/14* (2013.01); *H04W 4/70* (2018.02); *H04L 69/16* (2013.01); *H04W 84/06* (2013.01)

(58) Field of Classification Search
CPC .............................. H04B 7/1851; H04W 4/005
See application file for complete search history.

(56) References Cited

U.S. PATENT DOCUMENTS

| | | | |
|---|---|---|---|
| 5,303,286 A | 4/1994 | Wiedeman | |
| 5,448,623 A | 9/1995 | Wiedeman et al. | |
| 5,586,165 A | 12/1996 | Wiedeman | |
| 5,852,721 A | 12/1998 | Dillon et al. | |
| 5,978,849 A * | 11/1999 | Khanna | H04L 29/06 709/227 |
| 6,072,768 A | 6/2000 | Wiedeman et al. | |
| 6,157,834 A | 12/2000 | Helm et al. | |
| 6,233,463 B1 | 5/2001 | Wiedeman et al. | |
| 6,529,477 B1 * | 3/2003 | Toporek | H04B 7/18589 370/235 |
| 6,968,394 B1 | 11/2005 | El-Rafie | |
| 7,113,127 B1 | 9/2006 | Banet et al. | |
| 8,249,585 B2 | 8/2012 | Tronc et al. | |
| 8,326,217 B2 | 12/2012 | Wahlberg et al. | |
| 8,452,486 B2 | 5/2013 | Banet et al. | |

(Continued)

FOREIGN PATENT DOCUMENTS

| | | |
|---|---|---|
| EP | 1052812 A2 | 11/2000 |
| WO | 96/12377 A1 | 4/1996 |
| WO | 99/16201 A3 | 4/1999 |

*Primary Examiner* — Kamran Afshar
*Assistant Examiner* — Minjung Kim
(74) *Attorney, Agent, or Firm* — Thomas Horstemeyer, LLP (57) ABSTRACT

A wireless communication system includes one or more application servers communicating with remote terminals over connections established via cellular or satellite networks. The application servers are capable of switching between different cellular networks. A satellite gateway communicates with the remote terminals via satellite connections when cellular service is unavailable. The satellite gateway emulates a cellular network so that the application server sees the satellite gateway as another cellular network.

18 Claims, 8 Drawing Sheets

(56) References Cited

U.S. PATENT DOCUMENTS

| | | | |
|---|---|---|---|
| 8,520,694 B1* | 8/2013 | Bali | H04L 12/12 370/318 |
| 2003/0108031 A1* | 6/2003 | Inden | H04L 12/4625 370/352 |
| 2005/0047351 A1* | 3/2005 | Orsic | H04L 69/163 370/254 |
| 2005/0153732 A1 | 7/2005 | Stotelmyer et al. | |
| 2009/0186596 A1* | 7/2009 | Kaltsukis | G08B 25/08 455/404.2 |
| 2010/0169956 A1* | 7/2010 | Wang | H04M 11/007 726/5 |

* cited by examiner

TRANSPARENT SATELLITE COMMUNICATIONS IN A CELLULAR CENTRIC M2M NETWORK

FIELD OF THE INVENTION

This invention relates to the field of satellite communications, and in particular enhancing a satellite gateway so that a cellular centric application server is capable of seamlessly exchanging data over a satellite network with a remote data terminal.

BACKGROUND OF THE INVENTION

Figure 1:
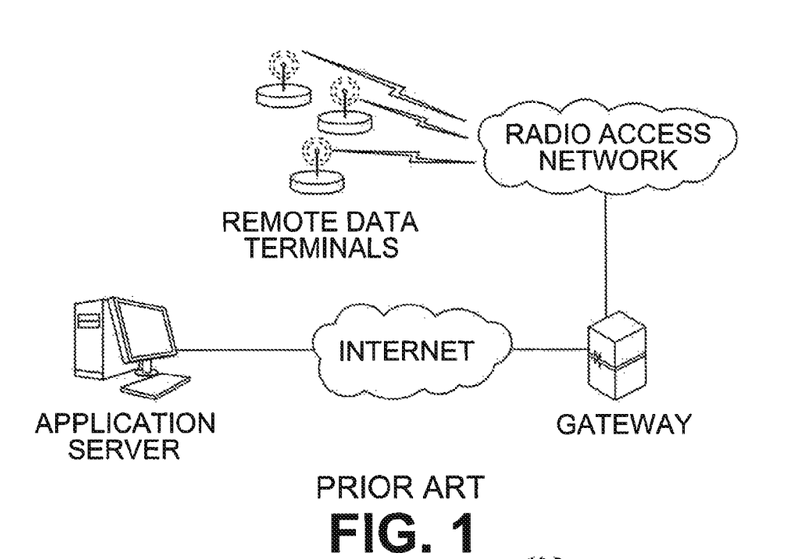
FIG. 1 shows a prior art wireless M2M communications network.
Figure 2:
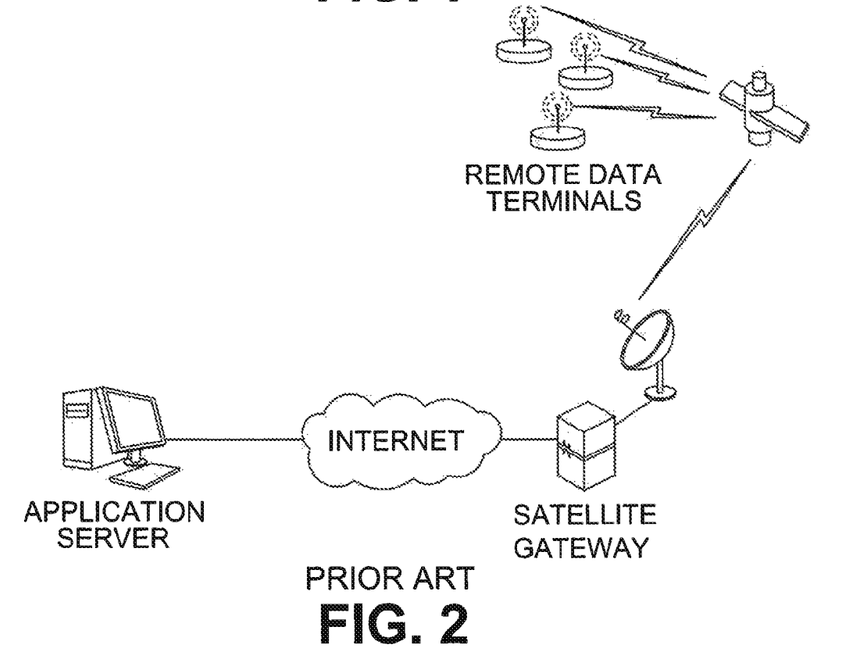
FIG. 2 shows a prior art low data rate satellite M2M communications network.

In machine-to-machine (M2M) radio communications, a multitude of remote data terminals exchange data with an application server. The remote data terminals communicate wirelessly with a radio access network that relays data via a gateway to the Internet or an intranet, as shown in FIG. 1.

Where the radio access network is a traditional low data rate satellite network as shown in FIG. 2, a multitude of remote data terminals exchange data with a satellite gateway in the form of messages that are transmitted over satellite links. These satellite communications use a highly bit-efficient data encoding in order to minimize cost. The satellite gateway, in turn, exchanges data with a multiplicity of application servers. Each remote data terminal communicates with a specific application server, with the communications being mediated by the satellite gateway. The application server may provide access to an end user, for example, through a web browser.

The communications between gateway and an application server use Internet-based protocols. The satellite gateway is non-transparent; that is, the application server sets up a TCP connection to communicate explicitly with the satellite gateway, which in turn sets up TCP connections to exchange messages with the server's associated remote data terminals.

Figure 3:
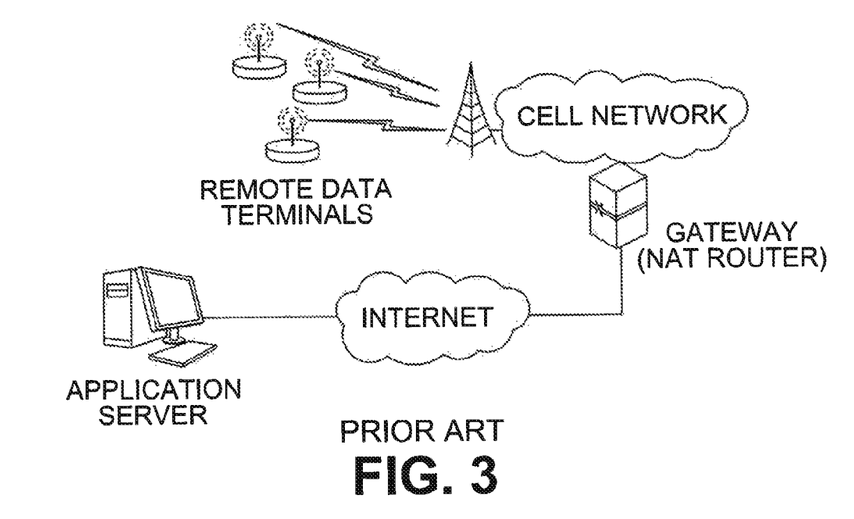
FIG. 3 shows a prior art cellular M2M communications network.

In traditional cellular M2M communications, remote data terminals send and receive data in the form of messages from an application server. Cellular communications occur between a remote data terminal and a cellular base station, which is connected via the cellular core network to an Internet-based network. The application server communicates with the remote data terminals via the Internet-based network. The cellular gateway is an IP router that typically also performs NAT (Network Address Translation), which maps between the private IP address space used in the cell network to the public IP address space used on the Internet. The operation of this cellular gateway is transparent; that is, the terminals and application server communicate as if they were directly connected to one another as shown in FIG. 3.

Figure 4:
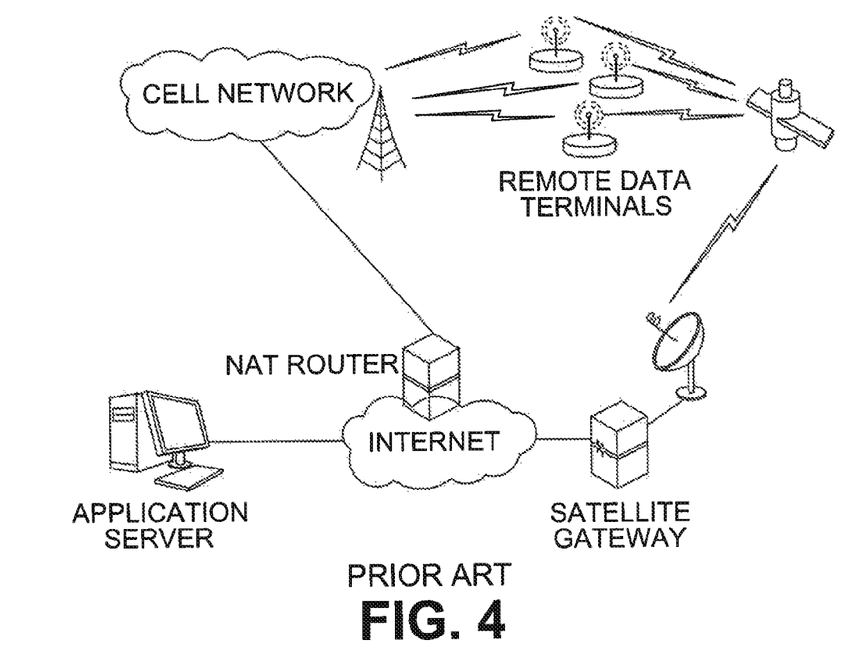
FIG. 4 shows a prior art network with dual mode remote data terminals supporting both satellite and cellular communications.

Some remote data terminals support both cellular and satellite communications, as shown in FIG. 4. These terminals are referred to as dual mode terminals. Before the application server can transmit data to a dual mode terminal it must choose which transport route it will use. The same is true of the dual mode terminal when it has data to transmit, but the dual mode terminal was designed with this decision process in mind. The designers of most M2M application servers did not anticipate the need to support dual mode terminals, and adding this capability after the fact is often difficult.

Figure 5:
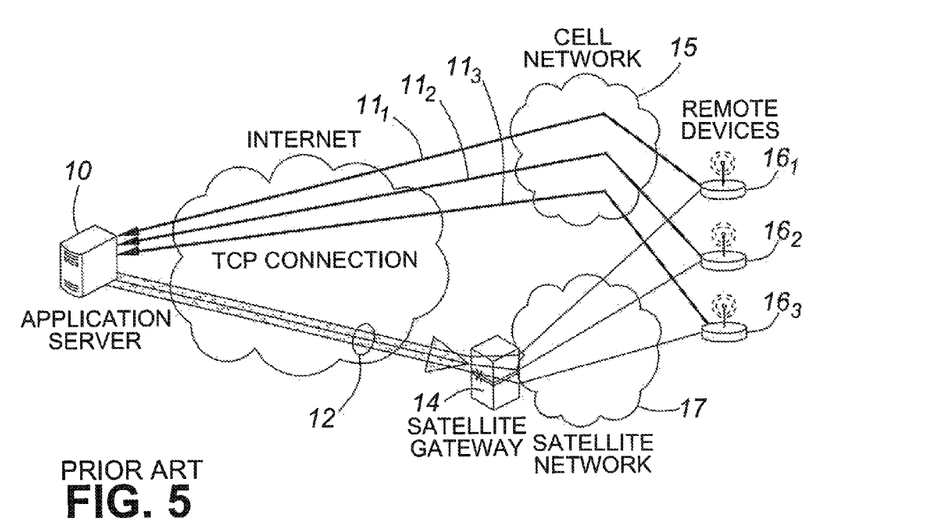
FIG. 5 shows the data connectivity of a prior art network with dual mode terminals.

FIG. 5 shows the connections associated with a fleet of dual mode terminals, with the connection arrows pointing at the server side of the client-server relationships. TCP (Transmission Control Protocol) is most often used as the transport layer protocol providing these connections, although UDP (User Datagram Protocol) is sometimes used in cellular M2M data networks. In the case of the cellular network 15, remote terminals $16_1$, $16_2$, $16_3$ wishing to communicate with the application server 10 set up TCP connections $11_1$, $11_2$, $11_3$ via the cellular network with the application server 10. If cellular service is not available, the application server 10 can set up a shared TCP connection with the satellite gateway 14, which in turn sets up separate satellite connections to the individual terminals $16_1$, $16_2$, $16_3$.

One of the obstacles to be overcome when attempting to integrate support for satellite data terminals into a cellular-centric application server is that the application server expects to communicate as if it is directly connected to the remote data terminals, whereas with satellite data communications it must first establish a connection to the satellite gateway and then use that connection to exchange data with the satellite remote data terminals.

The application server expects to receive incoming connections, e.g., TCP sessions, from remote data terminals, whereas with satellite data communications the application server is responsible for initiating the connection. It also expects to have a one-to-one relationship between connections and remote data terminals, whereas with satellite data communications, one TCP session is currently used to exchange data for multiple remote data terminals.

The application server does not expect to have more than one connection associated with a particular remote data terminal. When the application server wishes to send a message to a dual-mode satellite/cellular data terminal it must decide whether to send it via satellite or cellular.

An application server designed to communicate directly with cellular remote data terminals would require substantial enhancements and added complexity to communicate directly with the satellite only terminals or the dual mode terminals $16_1$, $16_2$, $16_3$ via the satellite gateway 14.

Another issue is the data encoding, which determines how a message data is to be encoded and decoded. In the current state of the art, cellular data terminals use proprietary data encodings and therefore the application servers typically support a variety of data encodings so that they can support data terminals from a variety of manufacturers. These application servers are thus designed to allow the easy addition of new encodings.

The application server includes a connection state machine that consists of the set of rules governing how a connection is established and torn down and how various success and failure conditions are handled. Most cellular data terminals have similar requirements for the connection state machine on the application server. There are variations depending on whether TCP or UDP is used as the transport layer protocol, but otherwise the behaviours are largely determined by the (standardized) workings of the cellular networks and the types of connectivity failures that are likely to occur on such a network. Application servers are only designed to support a narrow range of variation in the connection state machine, and this limitation is the major obstacle to integrating satellite service into a cellular-centric M2M network.

SUMMARY OF THE INVENTION

Embodiments of the invention enhance the function of the satellite gateway, satellite remote data terminals and dual mode terminals to allow cellular-centric application servers to communicate with satellite remote data terminals and dual mode terminals with a minimum of changes to the operation of the application servers.

According to the present invention there is provided a wireless communication system comprising one or more application servers configured to communicate with remote terminals over connections established via cellular or satellite networks, said application servers being capable of switching between said cellular networks; and a satellite gateway configured to communicate with the remote terminals via satellite connections, said satellite gateway being configured to emulate a cellular network so that said application server sees said satellite gateway as another cellular network. The invention thus takes advantage of the built-in features of application servers that make it relatively easy for them to communicate with different cellular networks.

In one embodiment the satellite gateway establishes a per-terminal connection with a particular application server upon receipt of an incoming request from a remote terminal over a satellite connection. The satellite gateway also translates subsequent messages received from the remote terminal over the satellite connection from a format used for satellite communications into a format used for cellular networks before forwarding the message to that particular application server over the established per-terminal connection. Unlike the prior art bi-directional per-terminal connections are established with the application server by the satellite gateway, rather than the other way round.

BRIEF DESCRIPTION OF THE DRAWINGS

The invention will now be described in more detail, by way of example only, with reference to the accompanying drawings, in which.

DETAILED DESCRIPTION OF EMBODIMENTS OF THE INVENTION

Figure 6:
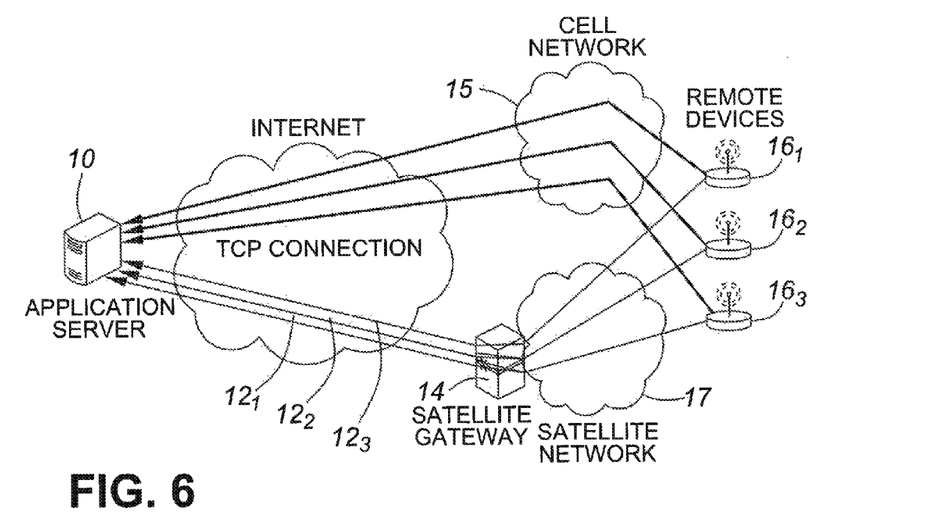
FIG. 6 shows an embodiment of the invention with per-terminal TCP connections for satellite communications.

One embodiment of the invention will now be described with reference to FIG. 6, which shows how the connectivity of FIG. 5 can be modified to emulate an all-cellular network system in a dual-mode environment. First, the shared satellite-data connection 12 established by the application server 10 is replaced by per-terminal connections $12_1$, $12_2$, $12_3$ established by the satellite gateway 14. Second, the satellite gateway 14 implements the same connection state machine and data encoding used by a cellular data terminal on behalf of each satellite or dual-mode data terminal.

As cellular M2M data service is typically faster and less expensive than satellite M2M data service, the dual mode terminals 16 ($16_1$, $16_2$, $16_3$) will typically be configured to use cellular whenever it is available. As long as a cellular data connection exists, the satellite gateway 14 does not establish a connection to the application server 10 for the corresponding terminal $16_1$, $16_2$, $16_3$. When a dual mode terminal $16_1$, $16_2$, $16_3$ detects that cellular communications is no longer available and wishes to send a message, it then routes its messages via the satellite service. Upon receiving a satellite message from the terminal, the satellite gateway 14 establishes a data connection $12_1$, $12_2$, $12_3$ to the application server 10 on behalf of the source terminal and then forwards the message to the application server 10 across the connection, say connection $12_1$, for terminal $16_1$. At that point, the application server 10 automatically closes any other connections associated with that remote data terminal. This mechanism of opening a new connection and closing an older connection is part of the connection state machine in dealing with cellular data terminals, because a cellular data terminal will occasionally roam onto another cellular network where it receives a new IP address. Its old IP address is no longer valid and therefore the terminal must close any existing data connections and open new connections using its new IP address.

When the satellite network 17 is modified according to the invention, the application server sees a dual mode terminal's move from cellular to satellite transport (or vice verso) as simply a move from one cellular network to another, which its connection state machine handles automatically as if the connection were still cellular, but was simply moving to a cellular network. The satellite gateway according to embodiments of the invention thus emulates a cellular network. Furthermore, since the data encoding seen by the application server 10 is identical regardless of whether cellular or satellite transport is used, then there is no apparent difference between the transports and hence no modifications to the application server are required to support dual mode terminals.

The above scheme applies also to satellite-only remote data terminals. So long as the application server 10 is able to encode and decode the messages then the application server will be able to communicate with the satellite data terminals. If the data encoding is not already supported then it is a straightforward integration exercise to add that support since the application server 10 merely sees another cellular network.

In accordance with the invention, it will be appreciated that the connections to the application server 10 are established by the satellite gateway. If an application server wishes to send a message to a terminal for which there is no active connection, and no traditional cellular service is available, any pending messages destined for that terminal are queued until a connection is established that is associated with that terminal, whether it be via the traditional cellular service or through the satellite gateway emulating a cellular network.

In other embodiments the satellite gateway 14 may decode and re-encode the data so that data transmitted over the satellite link is encoded so as to maximize bit-efficiency, which may not be the case with an encoding designed for use over cellular.

It will be appreciated that other transport protocols, e.g., Wi-Fi, Ethernet, can be used in place of TCP.

In an alternative solution a "multi-mode gateway" can be used to unite cellular and satellite traffic. The resulting merged traffic stream could be delivered either in a satellite-style single pipe or as cellular-style per-terminal pipe.

As noted the application server 10 receives incoming TCP (or UDP) connections from the satellite gateway 14. The following flow charts show a possible state machine for handling incoming TCP connections and processing incoming messages.

Figure 7:
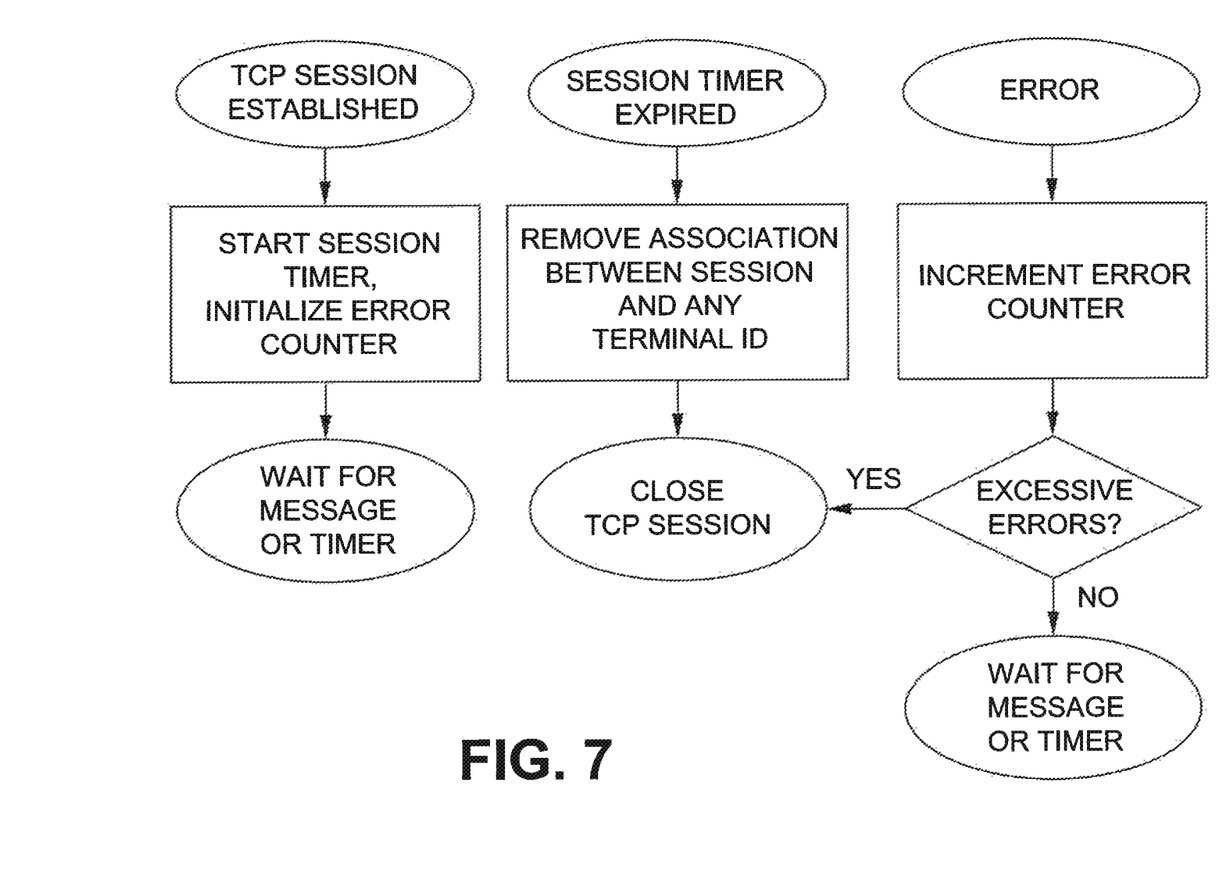
FIG. 7 shows flow charts for session establishment, session timer expiration and generic error handling.

FIG. 7 shows the message processing that occurs at the satellite gateway 14. Once a TCP session is established in association with a specific terminal 16 the satellite gateway 14 starts a session timer and initializes an error counter. The system then waits for a message. If no message is received from the terminal before the timer times out, the association between the TCP session and any terminal is removed and then the TCP session is closed.

If an error occurs, the error counter is incremented. If excessive errors are counted, meaning that the number of errors exceeds a predetermined limit, the TCP session is closed. If not, the system waits for a message from the terminal or the timer to time out.

Figure 8:
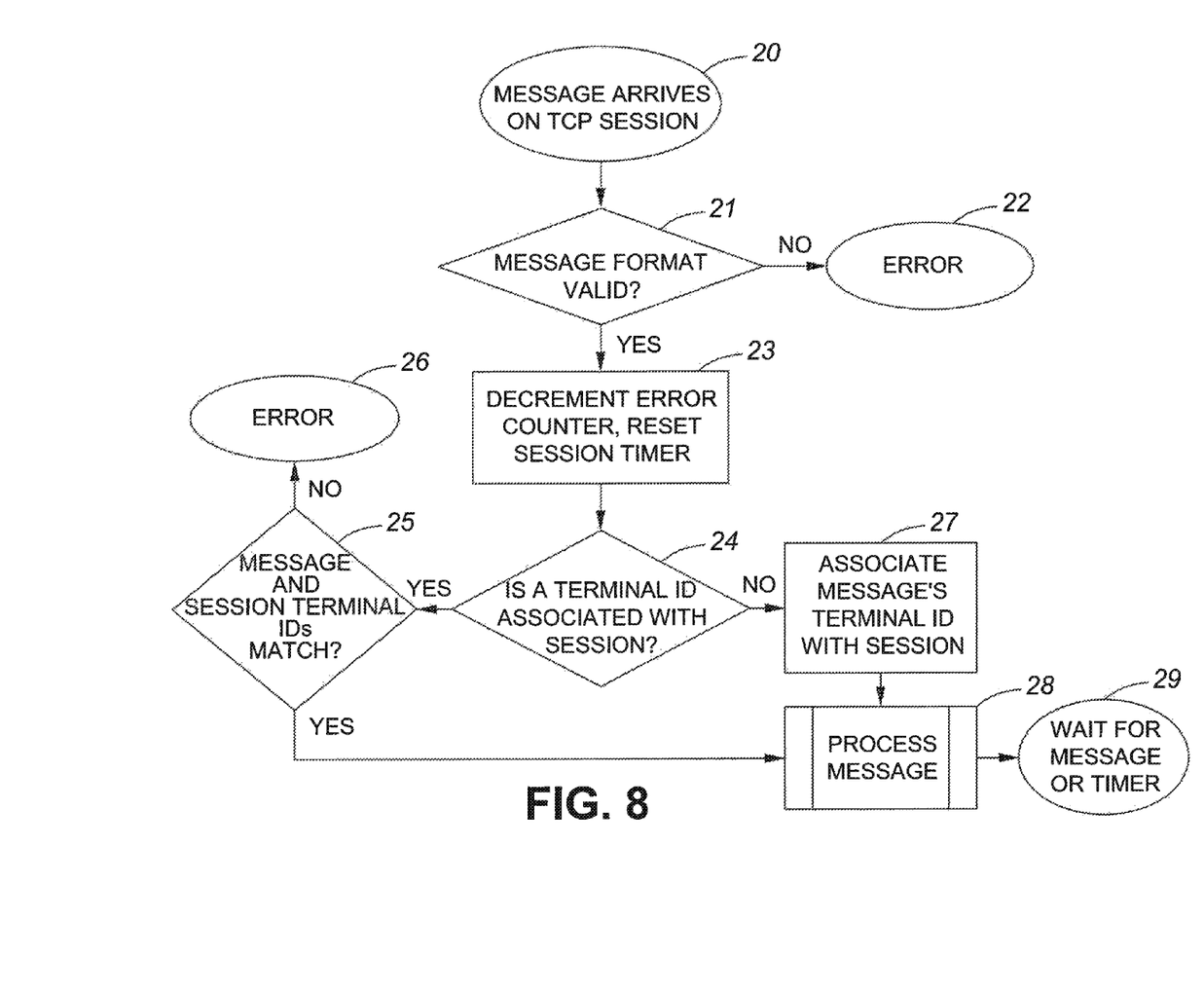
FIG. 8 is a flow chart showing a message arriving on a TCP session.

FIG. 8 shows how an incoming message is processed in accordance with the state machine in the satellite gateway 14. An important part of the function of the state machine is to associate a terminal 16, which is designated by an ID, with a TCP session. In this example, each message carries the terminal ID, such as a serial number or a cellular IMEI, IMSI or MEID. Once a valid message has arrived on a TCP session at 20, the message's terminal ID is associated with the session, and any message arriving in that session that has a different terminal ID is rejected at 25.

At 21 the system first checks to see if the message has a valid format. If not, an error message is generated at 22. If yes, the error counter is decremented and the session timer is reset at 23. At step 24, the system checks to sees if a terminal ID is associated with the session on which the incoming message has arrived. If yes, step 25 checks to see if the message and terminal IDs match, If not an error message is generated at 26; otherwise the message is processed at 28.

If the system determines at step 24 that no terminal ID is associated with the session, the system associates the terminal ID with the session at step 27 and processing passes to step 28, whereupon the system waits for the next message or a time-out of the timer at step 29.

Each terminal ID can be associated with at most one session. If a message arriving in a new TCP session carries a terminal ID that is associated with another connection, the older connection is closed and the terminal ID is associated with the new TCP session.

This purpose of the mechanism for switching a terminal ID's association from an older session to a newer session is to accommodate a cellular terminal roaming to a different cellular network, which causes the terminal to lose the IP address used by its session. The terminal 16 must then establish a new session using the IP address assigned to the terminal 16 by the new cellular network, and the application server must shut down the old session and use the new session instead. Embodiments of the invention takes advantage of this mechanism: the satellite gateway 14 makes the terminal 16 appear to the application server 10 as if it has roamed to a different cellular network. The satellite gateway in essence emulates another cellular network.

The following message diagrams show how the terminal 16 and gateway 14 co-ordinate to establish TCP or UDP communications.

Figure 9:
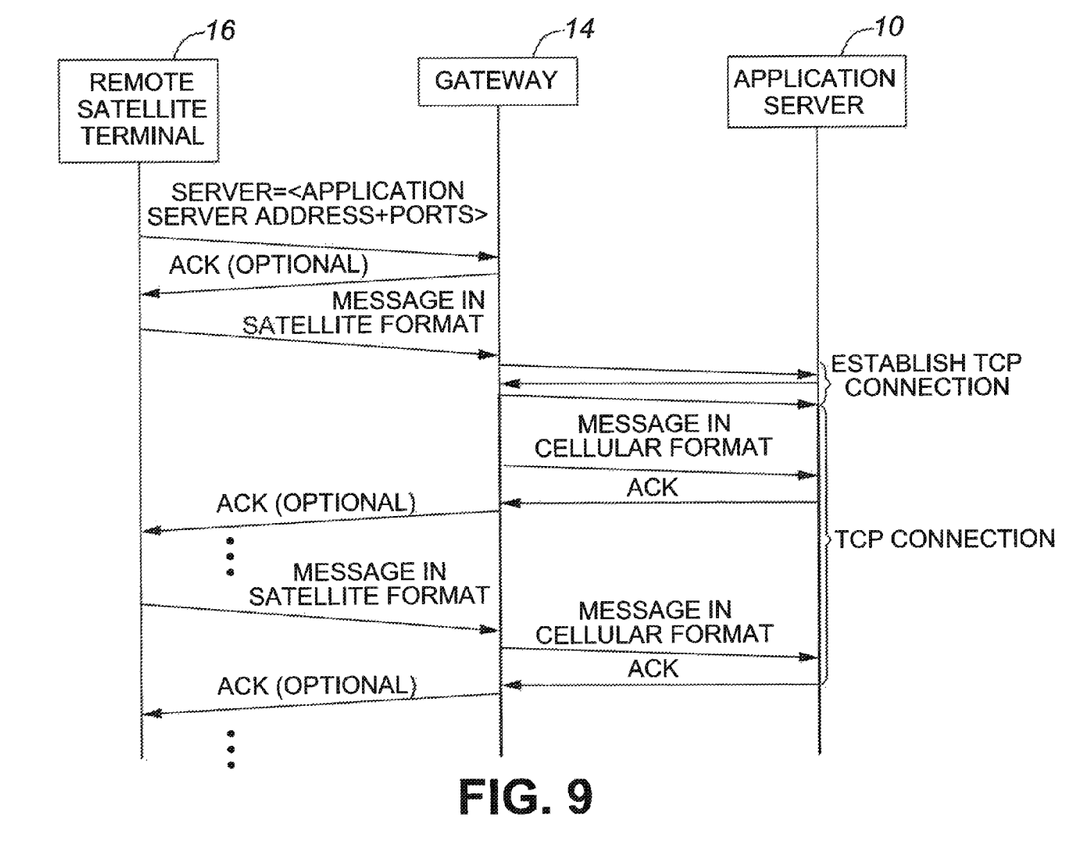
FIG. 9 is a message diagram showing the establishment of a TCP connection between a Satellite Gateway and Application Server.

FIG. 9 shows the establishment of a TCP connection between satellite gateway 14 and application server 10. FIG. 9 also shows how TCP connections are established by the satellite gateway 14 on behalf of the remote satellite (or dual mode) terminal 16 and then used to transport M2M messages. As shown, the terminal 16 first tells the satellite gateway 14 what IP address and TCP port number will be used to connect to the application server 10. The satellite gateway 14 stores this information until the terminal 16 sends a message via satellite, at which time the gateway 14 establishes a TCP connection to the specified application server 10 and then uses the resulting connection to send the message. The gateway 14 is responsible for re-encoding the message so that it is in the same format as would be sent over a cellular network. The gateway then sends the message in cellular format to the application server 10, which may respond with a message of its own. The gateway then reformats the message received from the application server 10 into satellite format before forwarding it to the remote terminal 16 via the satellite connection.

The TCP connection is typically left open for a period of time after the message exchange is complete so that subsequent messages, if sent before that period of time expires, will not require the overhead of TCP connection setup.

Figure 10:
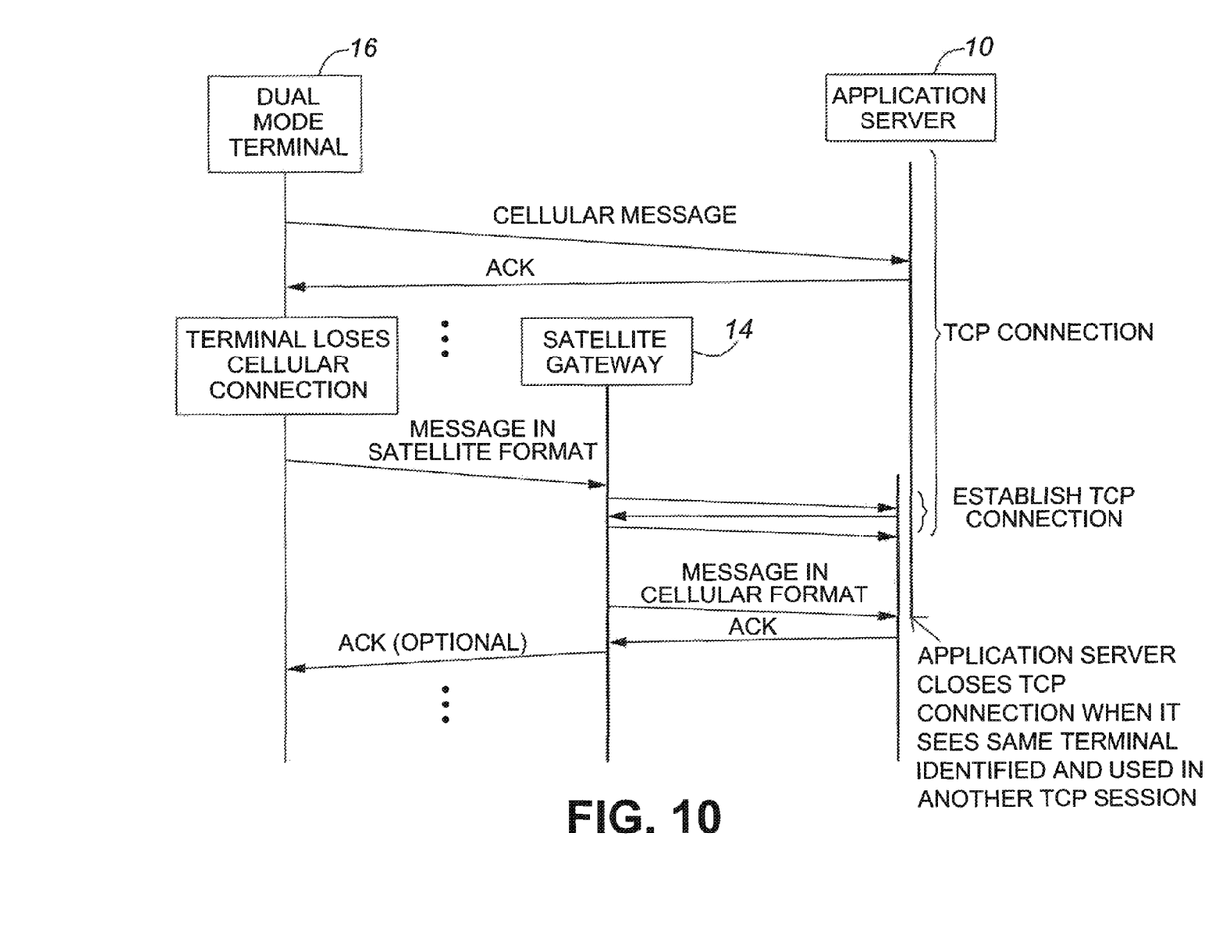
FIG. 10 is a message diagram showing the switching from cellular to satellite communications.

FIG. 10 shows a dual mode terminal 16 that has a TCP connection established with the application server 10 via its cellular link. The terminal 16 uses that connection to carry cellular messages and acknowledgements. A from-terminal message is shown but when a TCP connection is already established it can also carry to-terminal messages from the application server 10 to the terminal.

Figure 11:
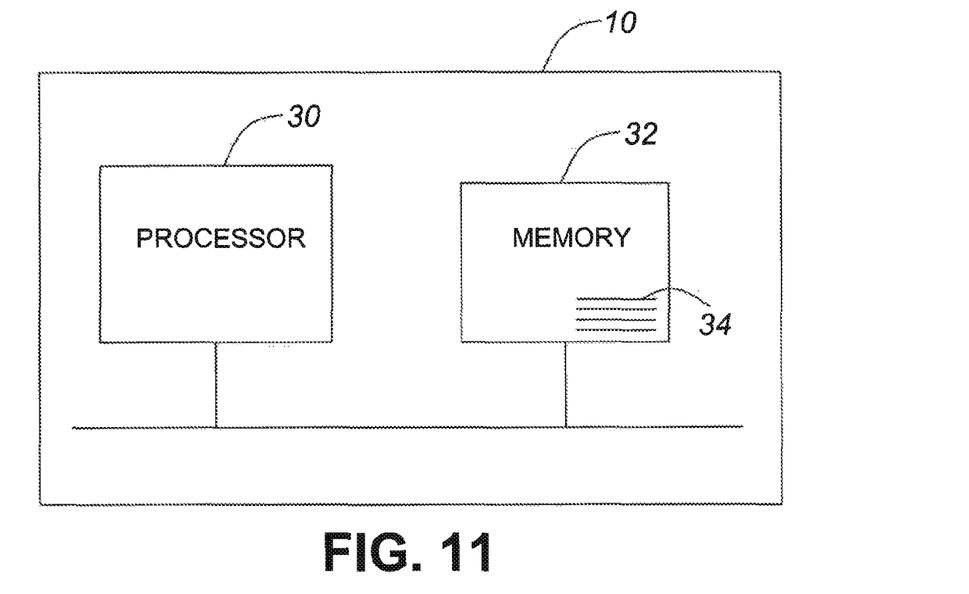
FIG. 11 is a schematic view of an application server.

FIG. 11 shows the application server 10, which includes processor 30 and memory 32. Messages 34 for a terminal, received, for example, from an end-user via a browser, are queued in memory.

It is assumed that the terminal 16 has previously informed the satellite gateway 14 of the application server's IP address and TCP port number as shown in FIG. 9. When the dual mode terminal loses its cellular connection, subsequent messages will be sent via satellite. When the satellite gateway 14 receives a message it establishes a TCP connection to the application server 10 associated with the terminal 16 and then uses that connection to forward the message, which it first converts into the same encoding used by the terminal when sending a cellular message. The application server 10 perceives the message as coming from the terminal 16 via a cellular network, albeit a different cellular network than before. It terminates the TCP connection previously associated with the terminal ID on the assumption that the terminal as roamed to a new cellular network.

Figure 12:
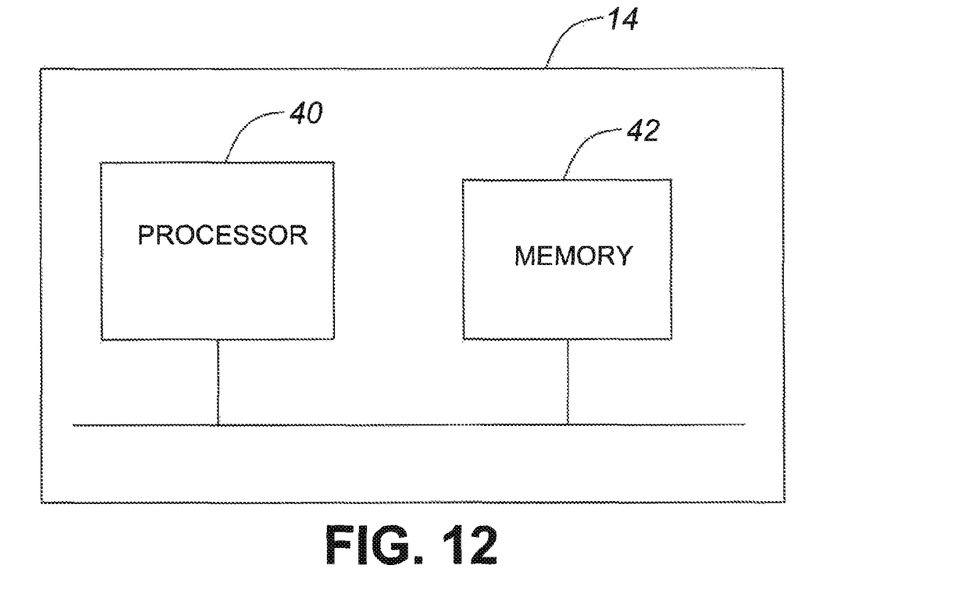
FIG. 12 is a schematic view of a satellite gateway.

It will be appreciated that the invention can be implemented in software run on a processor in the satellite gateway. FIG. 12 is a schematic view of a gateway including a processor 40 for running the software and memory 42.

The invention claimed is:

1. A wireless communication system comprising:
one or more application servers configured to at least:
communicate with remote terminals over connections established via cellular networks; and
queue any outgoing messages for that particular remote terminal when no cellular service is available and no connection is established with a particular destination remote terminal pending establishment of a connection; and a satellite gateway comprising an error counter for error checking messages received from the remote terminals over a satellite connection, the satellite gateway being configured to at least:
  communicate with the remote terminals via satellite connections; and
  upon receipt of an incoming request from a remote terminal over the satellite connection to connect with a particular application server, said satellite gateway establishes a per-terminal connection with the particular application server and translates subsequent messages received from the remote terminal over the satellite connection from a format used for satellite communications into a format used for cellular networks before forwarding the message to the particular application server over the established per-terminal connection, and
  close the connection after a predetermined number of errors have been encountered,
  wherein the incoming request from the remote terminal comprises a terminal ID that uniquely and permanently identifies the remote terminal and is associated only with the per-terminal connection between said satellite gateway and the particular application server, such that upon receiving a further incoming request from the remote terminal where the terminal ID is associated with an older per-terminal connection, said satellite gateway closes said older per-terminal connection and the satellite gateway associates said further incoming request from the remote terminal with the per-terminal connection, and
  wherein said particular application server sees said satellite gateway as another cellular network.

2. A wireless communication system as claimed in claim 1, wherein said satellite gateway is configured to establish said per-terminal connection with the application server over the Internet.

3. A wireless communication system as claimed in claim 2, wherein said request contains an address and a port ID for said connection to access the application server.

4. A wireless communication system as claimed in claim 3, wherein said per-terminal connection uses a version of the Transmission Control Protocol (TCP).

5. A wireless communication system as claimed in claim 3, wherein said per-terminal connection uses a version of the User Datagram Protocol (UDP).

6. A wireless communication system as claimed in claim 1, wherein said satellite gateway is configured to close said per-terminal connection after a predetermined period of time during which no message has been received from the remote terminal.

7. A satellite gateway communicating with remote terminals via satellite connections in a wireless communication system comprising one or more application servers that communicate with the remote terminals over connections established via cellular or satellite networks and are configured to at least queue any outgoing messages for a remote terminal when no cellular service is available and no connection is established with a particular destination remote terminal pending establishment of a connection,
  wherein said satellite gateway includes an error counter for error checking messages received from the remote terminals over a satellite connection, and wherein said satellite gateway is configured to at least:
  close the connection after a predetermined number of errors have been encountered, and
  upon receipt of an incoming request from a remote terminal over a satellite connection to connect with a particular application server, said satellite gateway establishes a per-terminal connection with the particular application server and translates subsequent messages received from the remote terminal over the satellite connection from a format used for satellite communications into a format used for cellular networks before forwarding the message to the particular application server over the established per-terminal connection,
  wherein the incoming request from the remote terminal comprises a terminal ID that uniquely and permanently identifies the remote terminal and is associated only with the per-terminal connection between said satellite gateway and the particular application server, such that upon receiving a further incoming request from the remote terminal where the terminal ID is associated with an older per-terminal connection, said satellite gateway closes said older per-terminal connection and the satellite gateway associates said further incoming request from the remote terminal with the per-terminal connection, and
  wherein said particular application server sees said satellite gateway as another cellular network.

8. A satellite gateway as claimed in claim 7, which is configured to establish said per-terminal connection with the application server over the Internet.

9. A satellite gateway as claimed in claim 8, wherein said incoming request contains an address and port ID for said satellite connection to access the particular application server.

10. A satellite gateway as claimed in claim 9, wherein said per-terminal connection use a version of the Transmission Control Protocol (TCP).

11. A satellite gateway as claimed in claim 9, wherein said per-terminal connection uses a version of the User Datagram Protocol.

12. A satellite gateway as claimed in claim 7, wherein said satellite gateway is configured to close said per terminal connection after a predetermined period of time during which no message has been received from the remote terminal.

13. A method of managing a wireless communication system comprising one or more application servers configured to communicate with remote terminals over connections established via cellular or satellite networks, said application servers being capable of switching between said cellular networks, and a satellite gateway configured to communicate with the remote terminals via satellite connections, said method comprising:
  receiving, at the satellite gateway, an incoming request from a remote terminal over a satellite connection;
  establishing, at the satellite gateway, a per-terminal connection with a particular application server; and
  translating, at the satellite gateway, subsequent messages received from the remote terminal over the satellite connection from the remote terminal over the satellite connection from a format used for satellite communications into a format used for cellular networks before forwarding the message to that particular application server over the per-terminal connection established at the satellite gateway,
  wherein the incoming request from the remote terminal comprises a terminal ID that uniquely and permanently identifies the remote terminal and is associated only with the per-terminal connection between said satellite gateway and the particular application server, such that upon receiving a further incoming request from the remote terminal where the terminal ID is associated with an older per-terminal connection, said satellite gateway closes said older per-terminal connection and the satellite gateway associates said further incoming request from the remote terminal with the per-terminal connection, wherein said particular application server sees said satellite gateway as another cellular network, wherein the application server queues any outgoing messages for that remote terminal when no cellular service is available and no connection is established with a particular destination remote terminal pending establishment of a connection, and wherein the satellite gateway includes an error counter for error checking messages received from the remote terminals over a satellite connection, and wherein said satellite gateway closes the connection after a predetermined number of errors have been encountered.

14. A method as claimed in claim 13, wherein said incoming request contains an address and a port ID for said per-terminal connection to access the application server.

15. A method as claimed in claim 14, wherein said per-terminal connection use a version of the Transmission Control Protocol (TCP).

16. A method as claimed in claim 14, wherein said per-terminal connection uses a version of the User Datagram Protocol (UDP).

17. A method as claimed in claim 13, wherein said satellite gateway closes said per-terminal connection after a predetermined period of time during which no message has been received from the remote terminal.

18. A method as claimed in claim 13, wherein the terminal ID comprises at least one of a serial number of the remote terminal, a cellular International Mobile Equipment Identity (IMEI) number of the remote terminal, or a mobile equipment identifier (MEID) number of the remote terminal.

* * * * *